United States Patent [19]

Kubota et al.

[11] Patent Number: 4,841,512
[45] Date of Patent: Jun. 20, 1989

[54] OPTICAL DISK APPARATUS WITH AN ERASE CHECKING FUNCTION

[75] Inventors: Shinji Kubota; Kazutoyo Hirosawa, both of Hirakata; Tomio Yoshida, Katano, all of Japan

[73] Assignee: Matsushita Electric Industrial Co., Ltd., Osaka, Japan

[21] Appl. No.: 942,790

[22] Filed: Dec. 17, 1986

[30] Foreign Application Priority Data

May 16, 1986 [JP] Japan ............... 61-112902

[51] Int. Cl.⁴ .............................. G11B 27/36
[52] U.S. Cl. ........................ 369/54; 369/58; 369/106; 369/116
[58] Field of Search ................ 369/44–46, 369/54, 58, 100, 106, 109, 116, 13, 32

[56] References Cited

U.S. PATENT DOCUMENTS

| | | | |
|---|---|---|---|
| 4,403,318 | 9/1983 | Nagashima et al. | 369/100 |
| 4,494,226 | 1/1985 | Hazel et al. | 369/54 X |
| 4,509,156 | 4/1985 | Ohara et al. | 369/54 |
| 4,566,088 | 1/1986 | Yoshida et al. | 369/44 |
| 4,571,716 | 2/1986 | Szerlip | 369/58 X |
| 4,583,210 | 4/1986 | Winslow | 369/116 X |
| 4,611,314 | 9/1986 | Ogata et al. | 369/54 X |
| 4,621,352 | 11/1986 | Kato | 369/54 |
| 4,638,472 | 1/1987 | Ogata et al. | 369/54 |
| 4,648,085 | 3/1987 | Shimonou | 369/54 |
| 4,679,184 | 7/1987 | Yoshida et al. | 369/109 X |

Primary Examiner—Alan Faber
Assistant Examiner—W. R. Young
Attorney, Agent, or Firm—Stevens, Davis, Miller & Mosher

[57] ABSTRACT

An optical disk apparatus is disclosed in which data is recorded, reproduced and erased on an erasable optical disk. After first data is recorded in a predetermined track or sector, it is erased. Second data is then recorded in the same track or sector, and it is decided that the erase function is normal when the second data is reproduced correctly.

8 Claims, 6 Drawing Sheets

OPTICAL DISK APPARATUS WITH AN ERASE CHECKING FUNCTION

BACKGROUND OF THE INVENTION

The present invention relates to an optical disk apparatus, or more in particular to an erasable optical disk apparatus in which a laser beam approximately 1 μm in diameter is irradiated on an optical recording medium thereby to record and reproduce a signal with high density and the signal thus recorded is erased by laser beam irradiation thereby to make possible repetitive signal recording and reproduction.

In an optical disk apparatus, signal recording is effected by modulating the intensity of the laser beam irradiated on the optical disk, by the signal recorded. The reproduction of the signal, on the other hand, is accomplished by irradiating a laser beam of a predetermined intensity on a signal recording section of the optical disk and thereby detecting variations of a reflected or transmitted light.

An example of the above-mentioned optical disk apparatus is shown in FIG. 6. In FIG. 6, reference numeral 101 designates a recording-reproducing semiconductor laser for generating a light beam of wavelength $\lambda_1$, and an output light beam thereof is shown by l. Numeral 102 designates a condensing lens for condensing the output light of the semiconductor laser to make a substantially parallel light beam. Numeral 10 designates a light beam combiner for transmitting light of wavelength $\lambda_1$ and reflecting light of wavelength $\lambda_2$. Numeral 106 designates a beam splitter, and numeral 107 a reflection mirror. Numeral 108 designates a focus lens for focusing the light beam l to produce a light spot L on a guide track 51 of the optical disk. Numeral 109 designates an actuator for performing the well-known focusing control.

Numeral 103 designates a semiconductor laser for generating a light beam m of wavelength $\lambda_2$, and numeral 104 a condensing lens for converting the light beam m into a substantially parallel light beam with an elliptical section. The light beam m is reflected on the beam combiner 105, and an elliptical light spot M with the longer diameter thereof directed longitudinally of the guide track is formed on the same guide track 51 as the light spot L as shown in FIG. 7.

In FIG. 6, the light reflected on the optical disk is applied through the focus lens 108 and the mirror 107 to the beam splitter 106, where the light path is changed and the light beam enters a filter 111. The filter 111 is adapted to pass the light l of the wavelength $\lambda_1$ but not the light m of wavelength $\lambda_2$. Numeral 112 designates a single lens for reducing the reflected light l. Numeral 113 designates a reflection mirror for reflecting a half of the light while passing the other half therethrough to a light detector 115.

Numeral 114 designates a half-split photo diode for detecting a focus error signal, which detects movement of the light $l_1$ and produces a focus error signal. Numeral 115 designates a half-split photo diode for detecting the tracking error signal by the light beam $l_2$.

Numeral 116 designates an erase laser drive circuit for driving the semiconductor laser 103 and controlling the intensity of the light spot M with the signal applied to the terminal Q.

Numeral 117 designates a record laser drive circuit for driving the semiconductor laser 101 and controlling the intensity of the light spot L with the signal applied to the terminal P.

FIG. 7 shows the two light spots irradiated on the guide track 51 of the disk shown in FIG. 6. The circular light spot L and the oval light spot M are arranged on the same guide track 51.

In this apparatus, in the event that the position of the laser source 103 mounted with mechanical accuracy is displaced by an operating temperature, environmental temperature or a shock, the erase function may be adversely affected with the erase light spot M displaced from the center of the guide track 51 carrying the light spot L causing failure to erase the data in the track involved fully or the undesirable erasure of the data in a neighbouring track. In an alternative case where the erase light spot M is subjected to tracking control, in contrast, the light spots L and M in FIG. 5 may follow different tracks, erasing the valuable data not to be erased in the neighbouring track.

SUMMARY OF THE INVENTION

The object of the present invention is to provide an optical disk apparatus in which whether the erase function is normal or not is easily and accurately detected thereby to protect data from erase function faults.

According to the present invention, there is provided an erasable optical disk apparatus comprising recording means for recording data in a predetermined track or a sector, reproduction means for reproducing the data recorded, erasing means for erasing the data recorded, check means for recording second data after first data is recorded and erased, and checking whether the second data is reproduced correctly, the erase function being confirmed by ensuring that the second data is reproduced correctly.

In the apparatus with the aforementioned construction according to the present invention, second data is recorded after recording and erasure of first data in a predetermined track or sector, and whether the second data is reproduced correctly or not is checked by the check means. If the erase function of the apparatus is not satisfactory and the erase performance thereof is deteriorated, the second data is not reproduced correctly as it is adversely affected by the large residual signal of the first data, and therefore it is possible to detect and confirm easily and accurately whether the erase function is normal or not.

According to another aspect of the present invention, there is provided an erasable optical disk apparatus comprising check means for recording second data after recording and erasure of first data and checking whether the second data is reproduced correctly, and power variable means for changing the power of the erase laser, wherein the power of the erase laser is changed within a predetermined range by the power variable means and the erase function is checked by the check means.

In the present invention with the above-mentioned configuration, first data is recorded in a predetermined track or sector, and in erasing the first data, the erase power is changed within a predetermined range by the power change means. Second data is then recorded, and whether the second data is correctly reproduced is checked by the check means. If the erase function is not sufficient after erasure with the erase power changed within the predetermined range, deterioration of the erase performance is emphasized, and therefore the residual signal in the reproduction signal increases. As a result, the second data is affected by the large residual signal of the first data, and the resulting failure of correct reproduction facilitates accurate detection of whether the erase function is normal or not.

DESCRIPTION OF THE PREFERRED EMBODIMENTS

Figure 1:
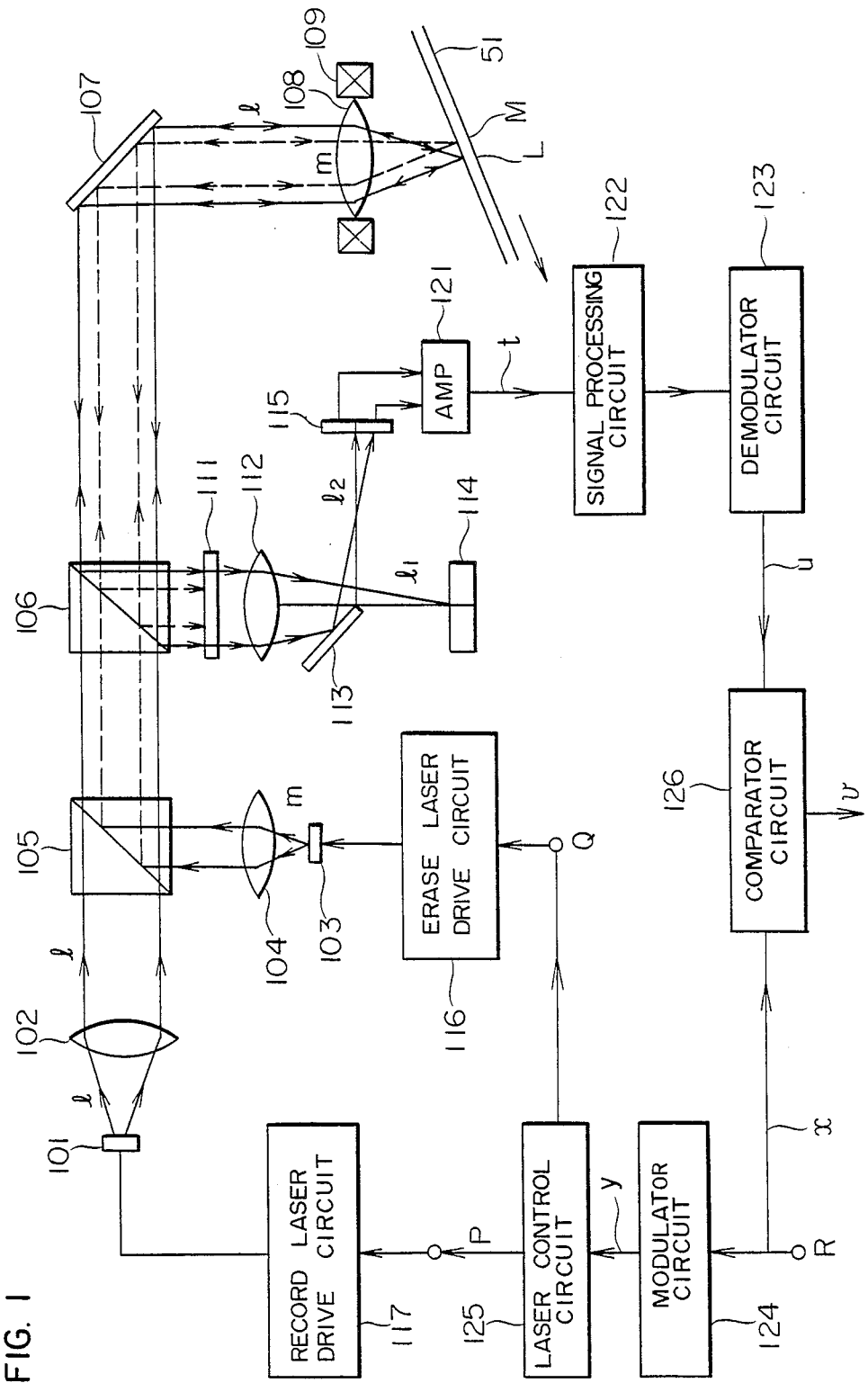
FIG. 1 is a block diagram showing an optical disk apparatus according to a first embodiment of the present invention.
Figure 2:
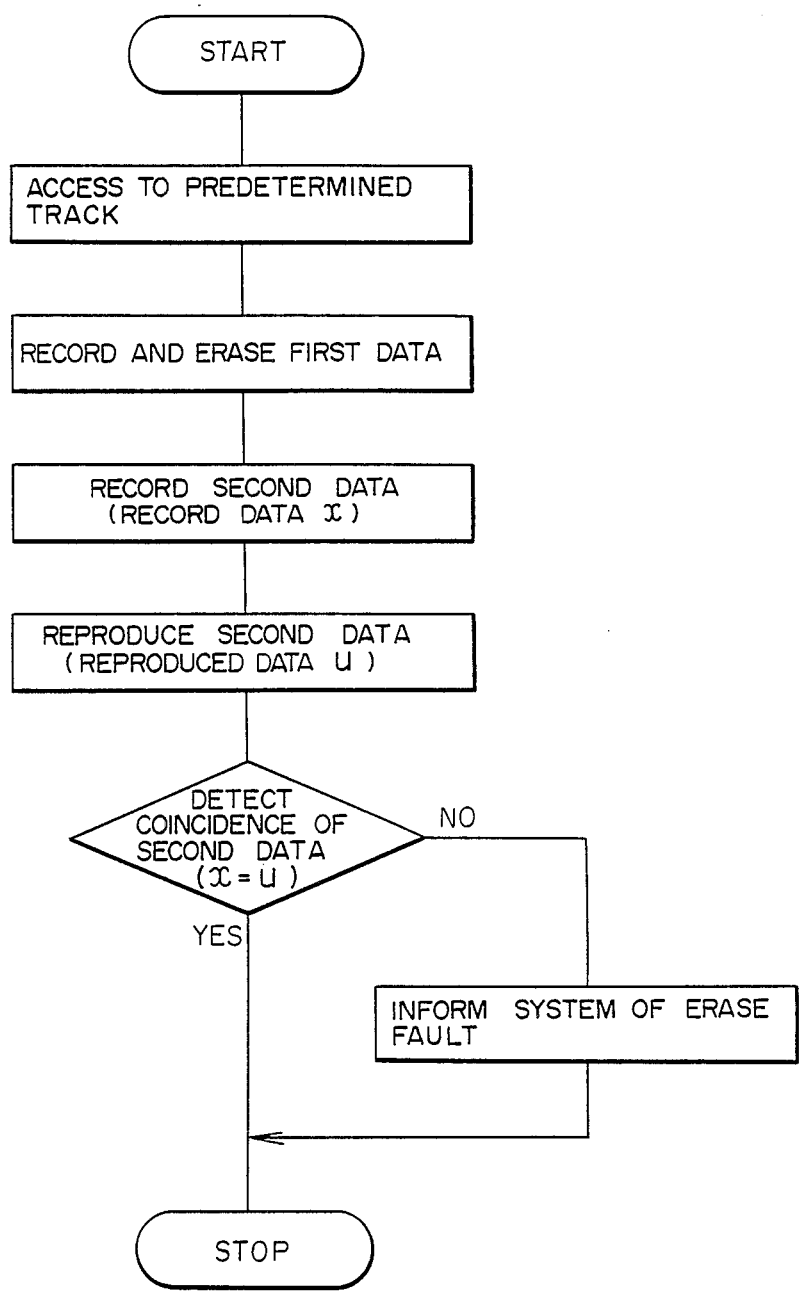
FIG. 2 is a flowchart for explaining the operation of the apparatus shown in FIG. 1.

A partial configuration of an optical disk apparatus according to an embodiment of the present invention is shown in FIG. 1, and a flowchart for explaining the operation thereof in FIG. 2.

Figure 6:
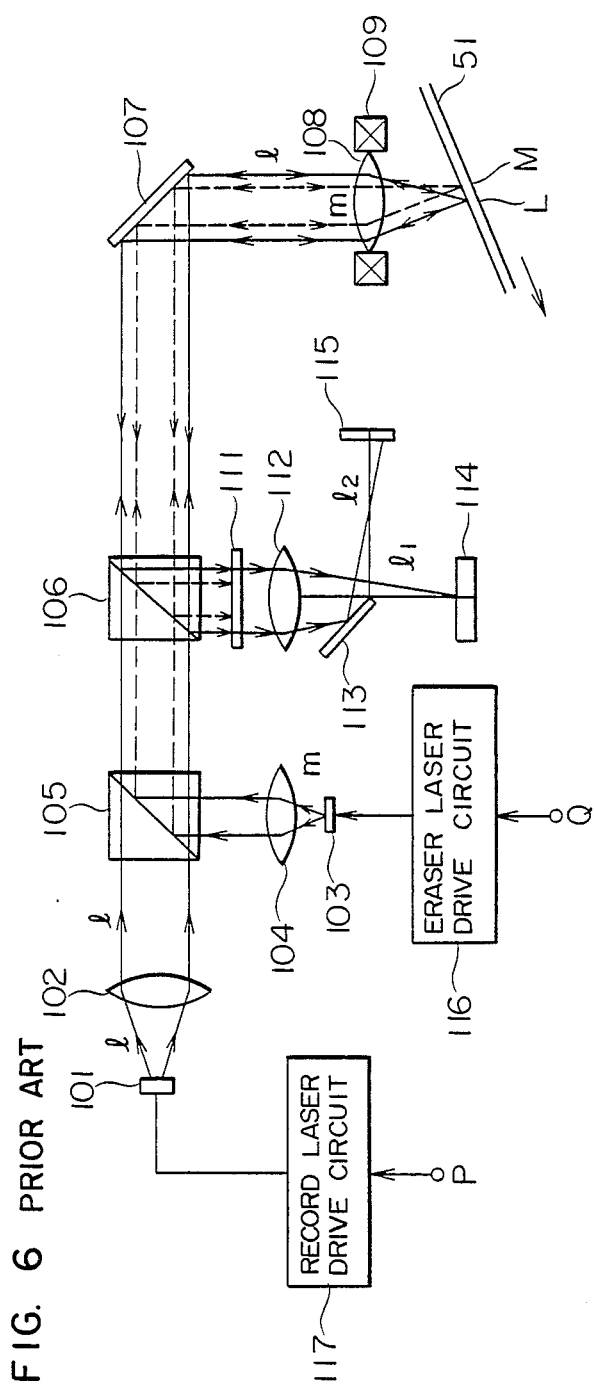
FIG. 6 is a block diagram showing a conventional optical disk apparatus.
Figure 7:
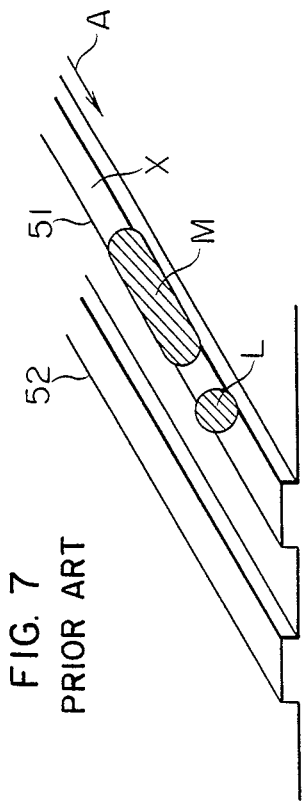
FIG. 7 is a diagram showing two light spots on an optical disk.

In the description that follows, a predetermined test track or a test sector will be referred to simply as "a predetermined track". In FIG. 1, the same component parts as in FIG. 6 showing a conventional apparatus will be designated by the same reference numerals or symbols as in FIG. 6.

First, in the configuration of FIG. 1, explanation will be made of the parts that are added to the apparatus of FIG. 6 explained already.

Numeral 121 designates a preamplifier. The reflected light l₂ of the small circular spot L which occurs in the process of scanning along the guide track 51 on the optical disk with the intensity of the reproduction light is detected by a light detector 115, and the resulting signal is amplified at the preamplifier 121. This signal is used as a reproduction signal for the signal recorded in the disk or various servo signals. Numeral 122 designates a signal processing circuit for digital binary processing by clipping the amplitude of the reproduction signal t from the preamplifier 121 at a predetermined level.

Numeral 123 designates a demodulator circuit in which data modulated by a modulator circuit 124 explained later and recorded on the disk is demodulated as reproduction data u in the form before original modulation.

Numeral 124 designates the modulator circuit in which the record data x recorded on the optical disk is modulated into a form most suitable for recording an reproduction in accordance with a predetermined rule, thus producing a modulated data y.

Numeral 125 designates a laser control circuit for controlling an erase laser drive circuit 116 and the record laser drive circuit 117 in accordance with the operation modes of recording, erasure and reproduction of the optical disk apparatus, and producing a record data signal and a timing control signal for illuminating each laser beam.

In the process of recording a signal on the optical disk, therefore, the laser control circuit 125 receives modulated data y from the modulator circuit 124, and applies a signal indicating a recording period and the modulated data y to the record laser drive circuit 117. By this signal, the output light of the semiconductor laser 101 is modulated in intensity on the basis of the modulation data y and recorded in the optical disk.

In the case where the signal recorded in the optical disk is to be erased, on the other hand, a signal representing an erase period is applied from the laser control circuit 125 to the erase laser drive circuit 116. During the application of the signal representing the erase period, the erase laser drive circuit 116 sets the output of the semiconductor laser 103 at a high output power level thereby to erase the signal recorded in the optical disk.

Numeral 126 designates a comparator circuit for checking to see whether the test data is reproduced correctly by comparing the data x recorded in the optical disk with the reproduced data u obtained by reproduction of the data recorded in the optical disk. Specifically, the comparator circuit 126 includes a memory for storing the recorded data x and a comparator for comparing the recorded data x with the reproduced data u.

When a comparator circuit 126 detects non-coincidence between the recorded data x and the reproduced data u, an non-coincidence pulse v indicating the incorrect reproduction of data is produced. The non-coincidence pulse v is connected to the controller of the recording and reproducing apparatus for supplying the controller with the information as to whether the erase function is normal or not.

In the apparatus according to this embodiment configured as above, the operation thereof will be explained with reference to FIG. 2.

First, a predetermined test track is accessed other than the regions where the user records data on the optical disk. This is to prevent the user data from being lost by the erase checking operation which may be performed in the user's data regions.

Next, the first data is sent from the terminal R in FIG. 1 to the modulator circuit 124 mentioned above. The first data which is converted into the modulated data y modulates the intensity of the semiconductor laser 101 through the laser control circuit 125 and the record laser drive circuit 117 and is recorded in the test track.

In the process, the reproduced data is compared with the recorded first data, and if there is any non-coincidence therebetween, the recording system may be faulty or the disk defective. In this case, the operation is shifted to another track for recording the first data again. If the reproduced data coincides with the recorded first data, in contrast, the recording system is regarded as normal and free of defects, and the process proceeds to the next step.

After, the first data is recorded, the terminal Q of the erase laser drive circuit 116 is supplied with a signal representing an erase period, so that the output of the semiconductor laser 103 is kept at high power for erasure during the period. If the erase function is normal, the first data of the test track is completely erased, and there is only a small residual signal of the reproduced signal t of the preamplifier 121. In the case where the erase function is not normal, in contrast, the first data of the test track is not erased completely resulting in a large residue of the reproduced signal t of the preamplifier 121.

The second data is then applied from the terminal R as recorded data x to the modulator circuit 124 and the comparator circuit 126. The comparator circuit 126 stores the recorded data x in memory. The second data that makes up the modulated data y through the modulator circuit 124 modulates th intensity of the semiconductor laser 101 through the laser control circuit 125 and the record laser drive circuit 117, and is recorded in the test track in which the first data has thus far been recorded and erased.

The second data recorded in the test track is produced as reproduced data u through the preamplifier 121, the signal processing circuit 122 and the demodulator circuit 123.

The second data that is the recorded data x stored in memory is then compared with the second data u reproduced at the comparator circuit 126.

If the residual signal after erasure of the first data is sufficiently small, the second data is correctly reproduced, and the second data recorded x and the reproduced data u coincide with each other, so that the erase function is decided to be normal. As a result, the in coincidence pulse v of FIG. 1 is not produced.

If the erase function of the apparatus is insufficient, on the other hand, the residual signal of the first data is so great that the second data is not reproduced correctly and the second data recorded x do not coincide with the reproduced data u, so that it is decided that the erase function is not normal. In the process, the non-coincidence pulse v of FIG. 1 is produced from the comparator circuit 126 to the system, thereby informing that the erase function is faulty.

As described above, according to the embodiment under consideration, data are recorded, erased and re-corded again with the existing erase and record means in an optical disk apparatus without any special circuit, and by thus checking data reproduced therefrom, it is possible to check the erase function easily and accurately. Further, since the erase function is checked by the effect that the residual signal after erasure has on the recorded and reproduced data, the checking operation is accurate and practical.

Figure 3:
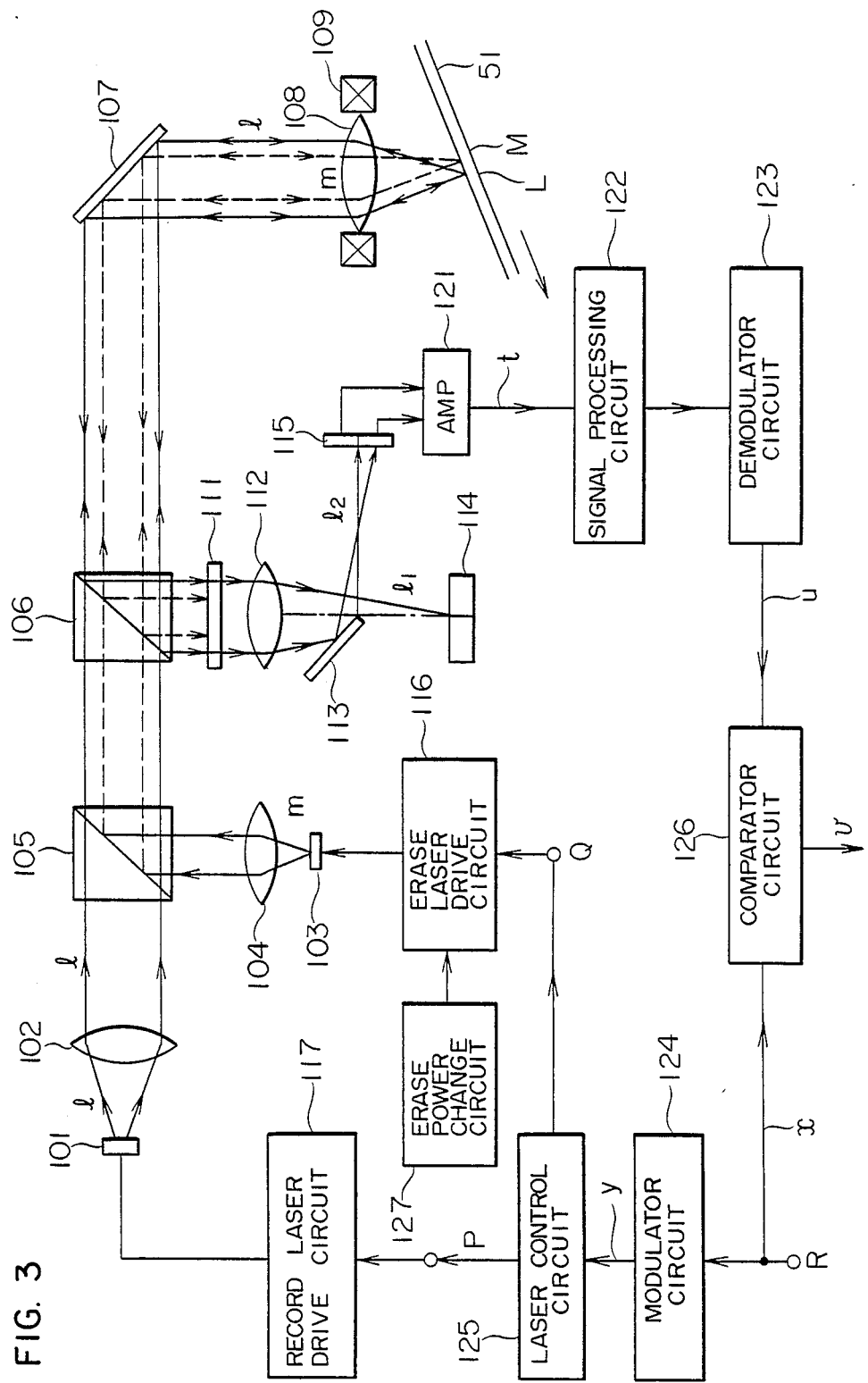
FIG. 3 is a block diagram showing an optical disk apparatus according to second embodiment of the present invention.
Figure 4:
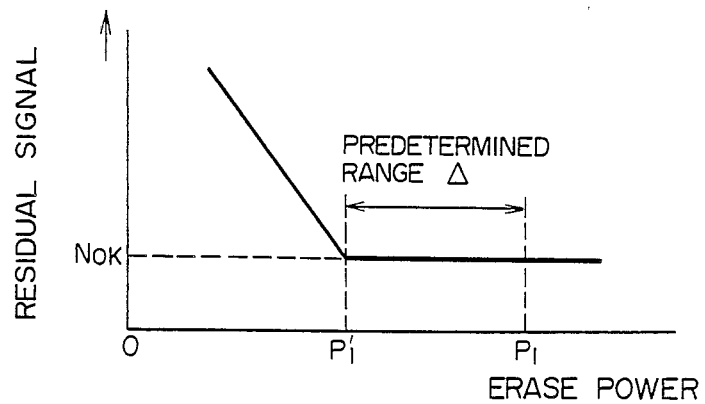
FIGS. 4a, 4b are diagrams for explaining the operation of the embodiment shown in FIG. 3.
Figure 4:
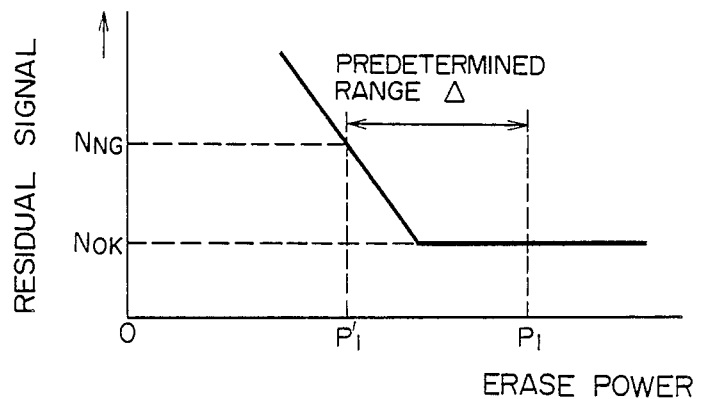
Figure 5:
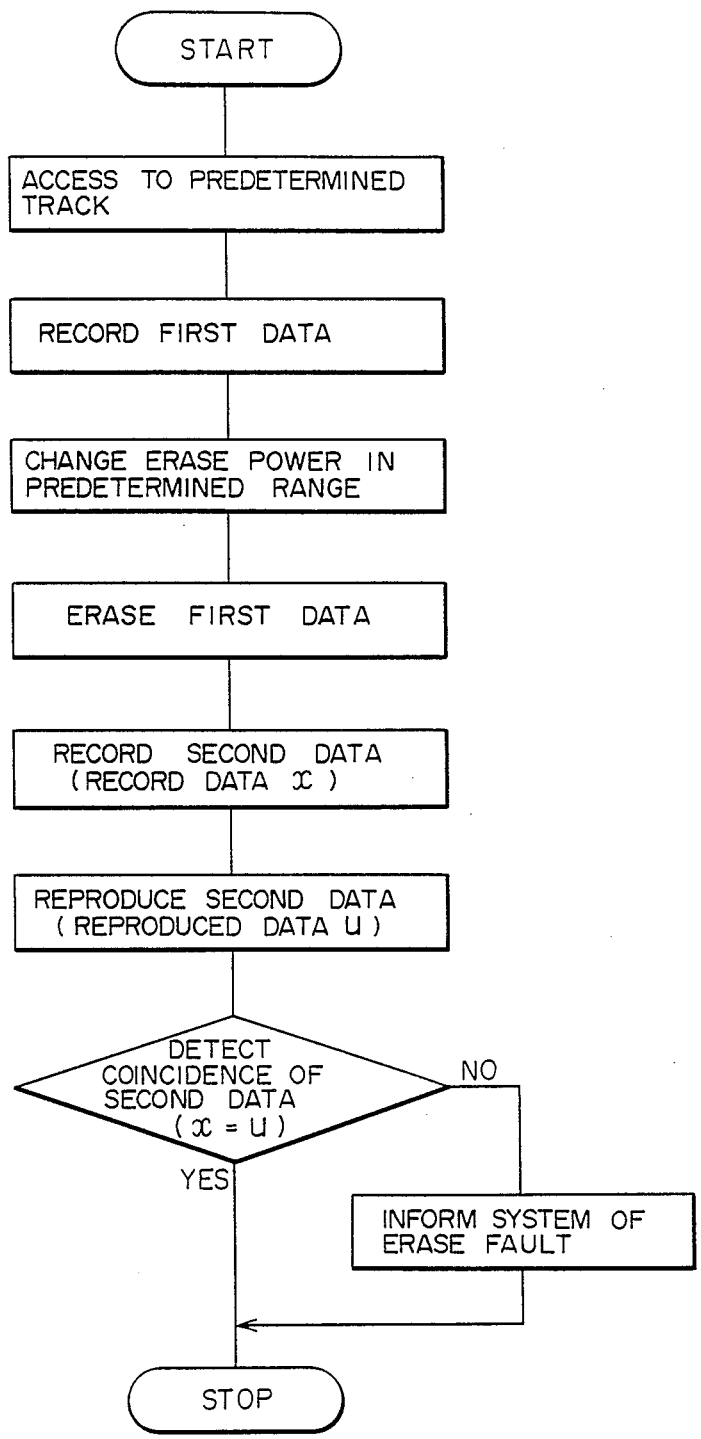
FIG. 5 is a flowchart for explaining the operation of the apparatus shown in FIG. 3.

A partial configuration of an optical disk apparatus according to a second embodiment of the present invention is shown in FIG. 3. FIG. 4 is a diagram for explaining the operating principle of a power changing circuit for changing the erase power within a predetermined range. FIG. 5 is a flowchart for explaining the operation of the whole apparatus.

In FIG. 3, an erase power changing circuit 127 is added to the circuit of FIG. 1 explained already. This circuit 127 is connected to the eras laser drive circuit 116 for changing the erase laser power by controlling the current or voltage value.

An example of the relations between the erase power and the residual signal left unerased is shown in FIG. 4. The abscissa represents erase power and the ordinate the residual signal left unerased.

FIG. 4 (a) shows the case in which the erase function is normal. Character $P_1$ in the diagram designates the normal optimum erase power, in which the magnitude of the residual signal is $N_{OK}$. This is sufficiently small and poses no problem. The minimum value of the erase power associated with the residual signal $N_{OK}$ is set to $P_1'$, and the variable range $\Delta$ of erase power for checking the erase function to $P_1 - P_1'$.

FIG. 4 (b) shows the relations between erase power and the residual signal after erasure in the case where the erase spot is displaced and the erase function is not normal. At the lower limit $P_1'$ of the erase power in the above-mentioned predetermined range $\Delta$, erasure is not sufficient, thereby increasing the residual signal to $N_{NG}$.

In the case where the erase power is changed by from $P_1$ to $P_1'$ for erasure, the residual signal is sharply increased making it possible t detect the displacement of the erase spot more severely if the erase function is not normal.

The operation of the apparatus configured as shown in FIG. 3 will be explained with reference to FIG. 5.

First, a predetermined test track is accessed other than the regions where the user records data on the optical disk. This is to prevent the user data from being destroyed, erroneously by checking the erase operation with the user data regions.

The first data is then applied from the terminal R in FIG. 1 to the modulator circuit 124. The first data that makes up the modulated data y modulates the intensity of the semiconductor laser 101 through the laser control circuit 125 and the record laser drive circuit 117 and is recorded in the test track.

At the same time, the reproduced data is compared with the recorded data, and if there is any non-coincidence, the recording system may be faulty or the disk defective, so that the operation is shifted to another track for recording the first data again. If the recorded data coincides with the reproduced data, in contrast, the recording system is determined normal and free of any defects, and the process proceeds to the next step. After recording of the first data, the erase power is changed by the predetermined range $\Delta$ at the power changing circuit 127, and set to $P_1'$.

After setting of erase power, the terminal Q of the erase laser drive circuit 116 is impressed with a signal representing an erase period, and the output of the semiconductor laser 103 is kept set to the power level $P_1'$ for that period for erasure. In the process, if the erase function is normal, the first data of the test track is completely erased and the residual part of the reproduced signal t of the preamplifier 121 is small. If the erase function is not normal, on the other hand, the first data is not completely erased but some part thereof left unerased, thereby increasing the residual signal of the reproduced signal t of the preamplifier 121.

Next, the second data is applied from the terminal R of FIG. 1 to the modulator circuit 124 and the comparator circuit 126 as record data x. The record data x is stored in memory by the comparator circuit 126. The second data that makes up the modulated data y through the modulator circuit 124 modulates the intensity of the semiconductor laser 101 through the laser control circuit 125 and the record laser drive circuit 117, and is recorded in the test track after recording and erasure of the first data.

The second data recorded in the test track is produced as reproduced data u through the preamplifier 121, the signal processing circuit 122 and the demodulator circuit 123.

The data x recorded as second data in memory is compared with the second data as reproduced data u at the comparator circuit 126.

If the residual signal after erasure is small, the second data is correctly reproduced, and the record data x of the second data coincides with the reproduced data u, so that it is decided that the erase function is normal and the non-coincidence pulse v in FIG. 1 is not produced.

In the case where the erase function of the apparatus is not sufficient, in contrast, the residual signal of the first data is so great that the second data is not correctly reproduced and the recorded data x as the second data do not coincide with the reproduced data u, and it is decided that the erase function is not normal. In the process, the non-coincidence pulse v of FIG. 1 is produced from the comparator circuit 126 to the system, informing that the erase function is faulty.

As explained above, according to this embodiment, data is recorded, erased and recorded again by use of the existing erase and record means in the optical disk apparatus but without any special circuit, and data reproduced therefrom is checked, thus making is possible to check the erase function both easily and accurately. It is also possible to check that the erase and record spots are located on the same track. Further, since the erase function is checked from the effect of the residual signal after erasure on the recorded and reproduced data, the checking operation is more accurate and practicable.

In the aforementioned two embodiments, the processes of record, erase, record, and comparison for detection of a coincidence for checking the erase function are performed only in a cycle. Instead, these operations may be repeated in two or more cycles in order to improve the accuracy.

Further, the aforementioned embodiments include means for recording the first data. This means, however, is not of course necessary if the first data is already recorded in a predetermined track or sector.

Instead of the comparator circuit used in the aforementioned embodiments for checking the correct reproduction of the second data, error detection means for CRC or parity check of the reproduced data may be used.

Furthermore, the erase function may be checked not at the time power is applied as in the aforementioned embodiments but at predetermined time intervals after power is on.

What is more, the erase function may be checked by track or sector on the disk.

Also, according to the present invention, not only the erase function but the record function may be checked by checking the reproduced data after recording the first data.

In addition to the optical disk apparatus performing recording and erasure with two spots, the present invention is also applicable to an optical disk apparatus which is recordable and erasable with a single spot.

What is claimed is:

1. An optical disk apparatus with an erase checking function comprising:
   recording means for recording data in a selected area of an optical disk by means of a very small spot produced from a light source;
   reproducing means for reproducing the data recorded by said recording means;
   erasing means for erasing data recorded by said recording means;
   erase checking means, operative during a test mode, for checking that said erasing means is correctly operating, said erase checking means causing said erasing means to erase first data recorded in a first test region of said optical disk, thereafter causing said recording means to record second data in said first test region where the first data has been erased, and determining if the second data thus recorded is correctly reproduced by said reproducing means; and
   power change means for changing the power level of said erasing means from a predetermined normal level when said erasing means erases said first data.

2. An optical disk apparatus with an erase checking function comprising:
   recording means for recording data in a selected area of an optical disk by means of a very small spot produced from a light source;
   reproducing means for reproducing the data recorded by said recording means;
   erasing means for erasing data recorded by said recording means;
   erase checking means, operative during a test mode, for checking that said erasing means is correctly operating, said erase checking means causing said erasing means to erase first data recorded in a first test region of said optical disk, thereafter causing said recording means to record second data in said first test region where the first data has been erased, and determining if the second data thus recorded is correctly reproduced by said reproducing means, said erase checking means being automatically operative in response to power being supplied to said optical disk apparatus.

3. An optical disk apparatus with an erase checking function comprising:
   recording means for recording data in a selected area of an optical disk by means of a very small spot produced from a light source;
   reproducing means for reproducing the data recorded by said recording means;
   erasing means for erasing data recorded by said recording means;
   erase checking means, operative during a test mode, for checking that said erasing means is correctly operating, said erase checking means causing said erasing means to erase first data recorded in a first test region of said optical disk, thereafter causing said recording means to record second data in said first test region where the first data has been erased, and determining if the second data thus recorded is correctly reproduced by said reproducing means, said erase checking means being automatically operative at predetermined intervals of time of operation of said optical disk apparatus.

4. An optical disk apparatus with an erase checking function comprising:
   recording means for recording data in a selected area of an optical disk by means of a very small spot produced from a light source;
   reproducing means for reproducing the data recorded by said recording means;
   erasing means for erasing data recorded by said recording means;
   erase checking means, operative during a test mode, for checking that said erasing means is correctly operating, said erase checking means causing said erasing means to erase first data pre-recorded on said optical disk in a first test region of said optical disk, thereafter causing said recording means to record second data in said first test region where the first data has been erased, and determining if the second data thus recorded is correctly reproduced by said reproducing means; and power change means for changing the power level of said erasing means from a predetermined normal level when said erasing means erases said first data.

5. An optical disk apparatus with an erase checking function comprising:

recording means for recording data in a selected area of an optical disk by means of a very small spot produced from a light source;

reproducing means for reproducing the data recorded by said recording means;

erasing means for erasing data recorded by said recording means;

erase checking means, operative during a test mode, for checking that said erasing means is correctly operating, said erase checking means causing said erasing means to erase first data recorded on said optical disk by said recording means in a first test region of said optical disk, thereafter causing said recording means to record second data in said first test region where the first data has been erased, and determining if the second data thus recorded is correctly reproduced by said reproducing means; and power change means for changing the power level of said erasing means from a predetermined normal level when said erasing means erases said first data.

6. An optical disk apparatus with an erase checking function comprising:

recording means for recording data in a selected area of an optical disk by means of a very small spot produced from a light source;

reproducing means for reproducing the data recorded by said recording means;

erasing means for erasing data recorded by said recording means;

erase checking means, operative during a test mode, for checking that said erasing means is correctly operating, said erase checking means causing said erasing means to erase first data recorded in a first test region of said optical disk, thereafter causing said recording means to record second data in said first test region where the first data has been erased, and determining if the second data thus recorded is correctly reproduced by said reproducing means, said erase checking means being automatically operative in response to power being supplied to said optical disk apparatus; and power change means for changing the power level of said erasing means from a predetermined normal level when said erasing means erases said first data.

7. An optical disk apparatus with an erase checking function comprising:

recording means for recording data in a selected area of an optical disk by means of a very small spot produced from a light source;

reproducing means for reproducing the data recorded by said recording means;

erasing means for erasing data recorded by said recording means;

erase checking means, operative during a test mode, for checking that said erasing means is correctly operating, said erase checking means causing said erasing means to erase first data recorded in a first test region of said optical disk, thereafter causing said recording means to record second data in said first test region where the first data has been erased, and determining if the second data thus recorded is correctly reproduced by said reproducing means, said erase checking means being automatically operative at predetermined intervals of time of operation of said optical disk apparatus; and power change means for changing the power level of said erasing means from a predetermined normal level when said erasing means erases said first data.

8. An optical disk apparatus with an erase checking function comprising:

recording means for recording data in a selected area of an optical disk by means of a very small spot produced from a light source;

reproducing means for reproducing the data recorded by said recording means;

erasing means for erasing data recorded by said recording means;

erase checking means, operative during a test mode, for checking that said erasing means is correctly operating, said erase checking means causing said erasing means to erase first data recorded in a first test region of said optical disk, thereafter causing said recording means to record second data in said first test region where the first data has been erased, and determining if the second data thus recorded is correctly reproduced by said reproducing means;

power change means for changing the power level of said erasing means from a predetermined normal level when said erasing means erases said first data; and means for causing said first data to be recorded in a second test region, different from the first test region, when first data recorded on said optical disk does not coincide with first data reproduced by said reproducing means.

* * * * *